United States Patent
Ge et al.

(10) Patent No.: US 10,620,950 B2
(45) Date of Patent: Apr. 14, 2020

(54) MESSAGE PARSING IN A DISTRIBUTED STREAM PROCESSING SYSTEM

(71) Applicant: International Business Machines Corporation, Armonk, NY (US)

(72) Inventors: Yi Ge, Beijing (CN); Xiao Xing Liang, Beijing (CN); Zhaotai Pan, Beijing (CN); Yu Chen Zhou, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 464 days.

(21) Appl. No.: 15/258,629

(22) Filed: Sep. 7, 2016

(65) Prior Publication Data
US 2018/0069917 A1 Mar. 8, 2018

(51) Int. Cl.
G06F 17/27 (2006.01)
G06F 17/30 (2006.01)
H04L 12/58 (2006.01)
H04L 29/06 (2006.01)
G06F 9/00 (2006.01)
H04L 12/46 (2006.01)
H04L 12/26 (2006.01)
H04L 12/00 (2006.01)
G06F 16/84 (2019.01)
G06F 40/151 (2020.01)
G06F 40/221 (2020.01)

(52) U.S. Cl.
CPC ............... G06F 9/00 (2013.01); G06F 16/84 (2019.01); H04L 12/00 (2013.01); H04L 12/4625 (2013.01); H04L 43/18 (2013.01); G06F 40/151 (2020.01); G06F 40/221 (2020.01)

(58) Field of Classification Search
None
See application file for complete search history.

(56) References Cited

U.S. PATENT DOCUMENTS

| 6,886,166 | B2 | 4/2005 | Harrison et al. |
| 7,526,769 | B2 | 4/2009 | Watts et al. |
| 7,548,926 | B2 | 6/2009 | Stern et al. |
| 8,224,980 | B2 | 7/2012 | Rosu |
| 8,484,230 | B2 | 7/2013 | Harnett et al. |
| 8,800,053 | B2 | 8/2014 | Ishida et al. |
| 9,058,181 | B2 | 6/2015 | Hwang et al. |
| 9,215,196 | B2 | 12/2015 | Singh et al. |

(Continued)

Primary Examiner — Nicholas R Taylor
Assistant Examiner — Ho T Shiu
(74) Attorney, Agent, or Firm — Amin, Turocy & Watson, LLP

(57) ABSTRACT

Techniques for parsing a message comprising at least one data field are provided. One computer-implemented method comprises: determining, by an electronic device operatively coupled to a processing unit, a first model from a first category of data processing models; and determining, by the electronic device, a second model from a second category of data processing models, the second category being different from the first category. The computer-implemented method also comprises comparing, by the electronic device, performance of a first combined model of first and second models with performance of the first model; and selecting, by the electronic device, a target model for processing data from the first combined model and the first model based on the comparing.

18 Claims, 4 Drawing Sheets

(56) References Cited

U.S. PATENT DOCUMENTS

| | | | | |
|---|---|---|---|---|
| 2002/0181495 | A1* | 12/2002 | Requena | H04L 29/06 |
| | | | | 370/465 |
| 2011/0019617 | A1* | 1/2011 | Ho | H04W 28/06 |
| | | | | 370/328 |
| 2015/0161098 | A1* | 6/2015 | Granshaw | G06F 17/30914 |
| | | | | 707/755 |
| 2016/0239527 | A1* | 8/2016 | Jang | G06F 16/2228 |

* cited by examiner

MESSAGE PARSING IN A DISTRIBUTED STREAM PROCESSING SYSTEM

BACKGROUND

The subject disclosure relates to data processing, and more specifically, to message parsing in a distributed stream processing system.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate message parsing in a distributed stream processing system are described.

According to one embodiment of the present disclosure, there is provided a computer-implemented method. The computer-implemented method can comprise identifying, by a device operatively coupled to a processor, a specific data field of a message comprising at least one data field, wherein the specific data field is employed for parsing the message. The computer-implemented method can also comprise generating, by the device, a mask sequence corresponding to the message and in which a first bit corresponding to the specific data field is set to a specific value. The computer-implemented method can also comprise parsing, by the device, the specific data field based on the specific value.

According to another embodiment of the present disclosure, there is provided a computer system. The computer system can comprise: at least one processor; a memory coupled to the at least one processor; and a set of computer program instructions stored in the memory, executed by the at least one processor to perform operations. The operations can comprise identifying a specific data field in at least one data field, wherein the specific data field is useful for parsing a message. The operations can also comprise generating a mask sequence corresponding to the message, wherein a first bit corresponding to the specific data field is set to a specific value. The operations can also comprise parsing the specific data field based on the specific value.

According to a further embodiment of the present disclosure, a computer program product for parsing a message containing at least one data field is provided. The computer program product can comprise a computer readable storage medium having program instructions embodied therewith. The program instructions can be executable by an electronic device to cause the electronic device to identify a specific data field in the at least one data field, wherein the specific data field is employed to parse the message. The program instructions can also be executable by an electronic device to cause the electronic device to generate a mask sequence corresponding to the message, wherein a bit corresponding to the specific data field is set to a specific value. The program instructions can also be executable by an electronic device to cause the electronic device to parse the specific data field based on the specific value.

It is to be understood that the Summary is not intended to identify key or essential features of embodiments of the present disclosure, nor is it intended to be used to limit the scope of the present disclosure. Other features of the present disclosure will become easily comprehensible through the description below.

DESCRIPTION OF THE DRAWINGS

Throughout the drawings, the same or similar reference numerals represent the same or similar elements.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

One or more embodiments described herein can perform message parsing and/or subsequent analysis for any number of different applications, including, but not limited to, information for or output from Internet of Things devices and systems. Big data analysis, stream processing and/or stream analysis of messages can be performed. For example, a stream processing system can he applied to the analysis service of the Internet of Things devices or systems to perform operations of inquiring, filtering and/or executing in millions of messages per second.

Figure 1:
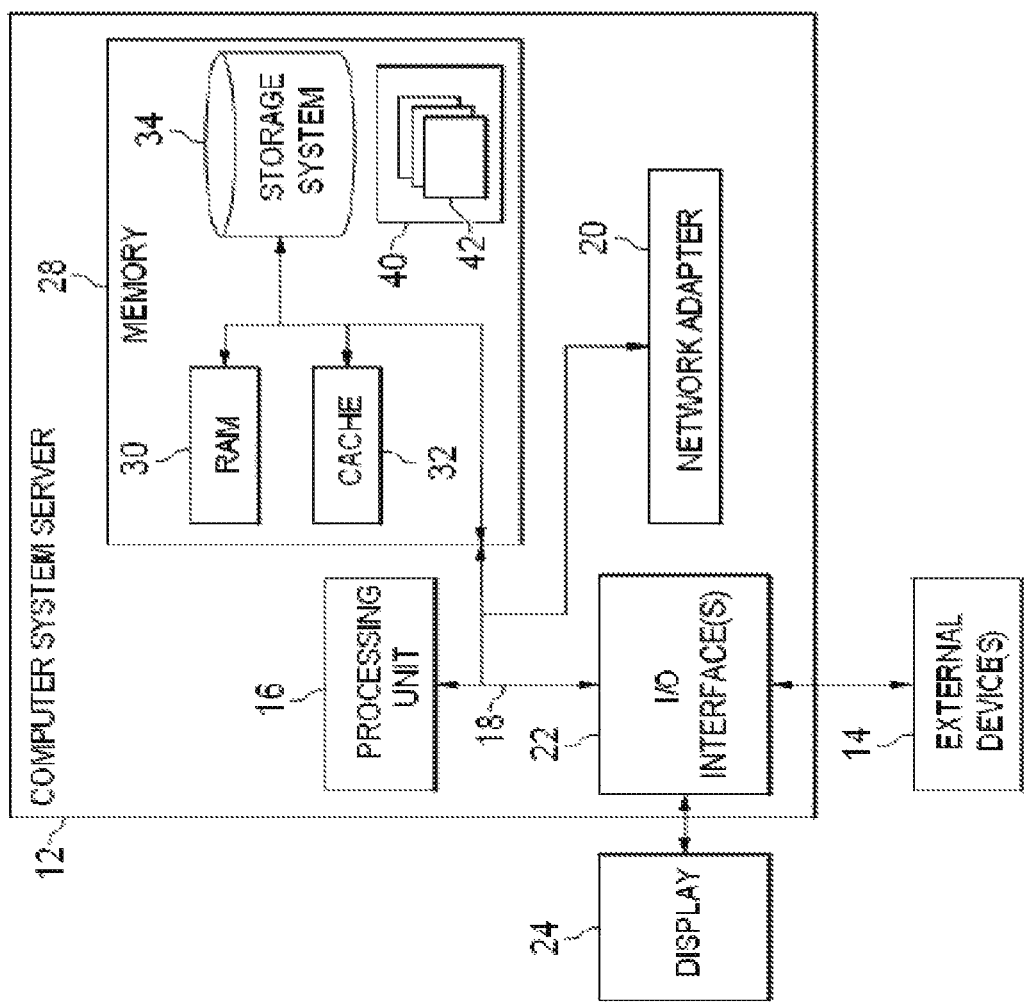
FIG. 1 shows an example, non-limiting computer system in which one or more of the embodiments of the present disclosure can be implemented.

FIG. 1 shows an example, non-limiting computer system in which one or more of the embodiments of the present disclosure can be implemented. The computer system/server 12 can be employed to implement one or more of the embodiments of the present disclosure. Computer system/server 12 is only illustrative and is not intended to suggest any limitation as to the structure of any devices that can perform one or more functions described herein and/or the scope of use or functionality of embodiments of the disclosure described herein.

The components of computer system/server 12 can include, but are not limited to, one or more processing units 16, a system memory 28, and a bus 18 that couples various system components including system memory 28 to processing unit 16. As used herein, the term "processing unit" should be understood to be interchangeable with the term "processor."

Bus 18 can represent one or more of any of several types of bus structures, including a memory bus or memory controller, a peripheral bus, an accelerated graphics port or a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

Computer system/server 12 typically includes a variety of computer system readable media. Such media can be any available media that is accessible by computer system/server 12, and it can include both volatile and non-volatile media, as well as removable and non-removable media.

System memory 28 can include computer system readable media in the form of volatile memory, such as random access memory (RAM) 30 and/or cache memory 32. Computer system/server 12 can further include other removable or non-removable, volatile or non-volatile computer system storage media. By way of example only, storage system 34 can be provided for reading from and/or writing to a non-removable, non-volatile magnetic media (not shown and typically called a "hard drive"). Although not shown, a magnetic disk drive for reading from and/or writing to a removable, non-volatile magnetic disk (e.g., a "floppy disk"), and an optical disk drive for reading from and/or writing to a removable, non-volatile optical disk such as a compact disc read-only memory (CD-ROM), digital versatile disc-read only memory (DVD-ROM) or other optical media can be provided. In such instances, one or more of the disk drives can be connected to bus 18 by one or more data media interfaces. As will be further depicted and described below, memory 28 can include at least one computer program product having a set of (or, in some embodiments, at least one) computer program modules that are configured to carry out the functions of one or more of the embodiments of the disclosure.

Program/utility 40, having a set or (or, in some embodiments, at least one) program modules 42, can be stored in memory 28. By way of example, and not limitation, other aspects that can be stored in memory 28 can include an operating system, one or more application programs, other program modules, and program data. The operating system, one or more application programs, other program modules, and/or program data or some combination thereof can include an implementation of a networking environment. Program modules 42 can generally carry out the functions and/or methodologies of one or more embodiments of the disclosure as described herein.

Computer system/server 12 can also communicate with one or more external devices 14 (e.g., a keyboard, a pointing device, a display 24), one or more devices that enable a user to interact with computer system/server 12 and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN) and/or a public network (e.g., the Internet) via network adapter 20. As depicted, network adapter 20 can communicate with the other components of computer system/server 12 via bus 18. It should be understood that although not shown, other hardware and/or software components can be used in conjunction with, or included within, computer system/server 12. Examples, include, but are not limited to: microcode, device drivers, redundant processing units, external disk drive arrays, redundant array of independent disks (RAID) systems, tape drives, and/or data archival storage systems.

In the stream processing and the stream analysis of messages for the Internet of things and solutions for big data analysis, in embodiments in which a variety of messages are parsed, the first act performed can be extraction of one or more values from the incoming raw message by making use of a parser so as to generate structural data. For high throughput stream data, such operations can be a very heavy workload. The generated structural data can be distributed by the network to one or more other data processing services for performing data analysis. In addition to the workload of parsing, the number of the parsed value items (e.g., generated structural data) can be greater than that of the number of value items to be used for data analysis. Accordingly, value items having little value can yet increase data transmission time between the parser and the different data processing services, and/or rapidly increase memory space consumption at high data throughput.

Accordingly, one or more embodiments described herein can select special data fields according to requirements of analysis logic, accelerate parsing of the incoming raw message into structural data for further processing of the analysis logic, remove the data fields that are of low value in the analysis logic from the parsed structural data, reduce the memory usage in the stream processing, and/or decrease network bandwidth occupied by allocating structural data in a distributed system.

Figure 2:
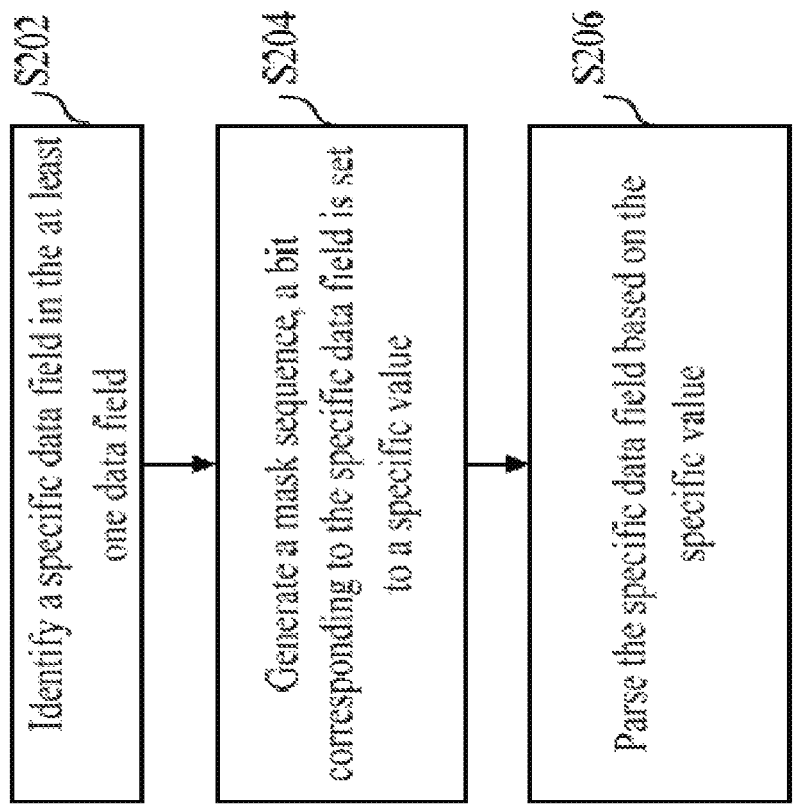
FIG. 2 is a flowchart illustrating an example, non-limiting computer-implemented method for parsing a message according to one or more of the embodiments of the present disclosure.

FIG. 2 is a flowchart illustrating an example, non-limiting computer-implemented method for parsing a message according to one or more of the embodiments of the present disclosure. As shown in FIG. 2, in S202, a specific data field in the at least one data field can be identified, wherein the specific data field is useful for parsing the message. In S204, a mask sequence corresponding to the message can be generated, in which a bit corresponding to the specific data field is set to a specific value. In S206, the specific data field can be parsed in accordance with (e.g., based on or as a function of the specific value.

According to one or more embodiments of the present disclosure, S202, S204, S206 can be implemented via processing unit 16 of computer system/server 12 of FIG. 1. For example, one or more of the computer program instructions stored in the memory 28 can be executed via the processing unit 16 and cause one or more of S202, S204, S206 to be performed. For example, S202 can be carried out by a first program instruction executed by the processing unit 16, S204 can be carried out by a second program instruction executed by the processing unit 16, and S206 can be carried out by a third program instruction executed by the processing unit 16.

Figure 3:
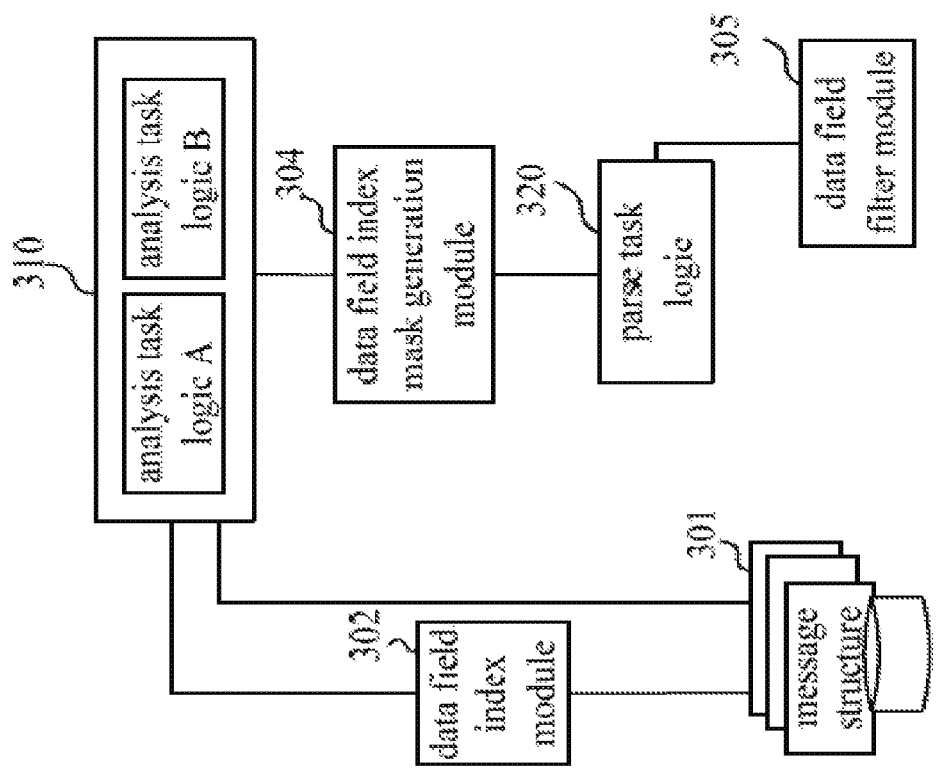
FIG. 3 is a block diagram illustrating an example, non-limiting computer system for parsing a message according to the one or more embodiments of the present disclosure.

FIG. 3 is a block diagram of a computer system for parsing a message according to the embodiment of the present disclosure. As shown in FIG. 3, the computer system/server 12 can include a data field index module 302, an analysis task logic 310, a data field index mask generation module 304, a data field filter module 305, and/or a parse task logic 320.

According to one embodiment, the data field index module 302 can be used for creating an index for all data fields (or, in some embodiments, one or more data fields) according to a message structure. A unique integer index can be created for each data field (or, in some embodiments, for one or more data fields) in a structural message. An integer sequence index can be created for all data fields (or, in some embodiments, one or more data fields) of a message in a nested structure.

According to one embodiment, the analysis task logic 310 can be used for collecting the indexes of the data fields in the message from the data field index module 302, identifying the data fields useful for parsing the message, and/or sending the indexes and information on the useful data fields to the data field index mask generation module 304. Hereinafter, the data field useful for parsing the message can also be referred to as "the specific data field."

According to one embodiment, the data field index mask generation module 304 can be used for collecting the indexes of the data fields and the information on the specific data fields sent from the analysis task logic 310, generating mask sequences corresponding to the indexes of the message, and/or sending the mask sequences to the parse task logic 320.

According to one embodiment, the data field filter module 305 can be used for filtering out useless data fields (or, in some embodiments, data fields meeting a defined criterion and/or having less than a particular utility) before or during the message parsing. Specifically, all data fields (or, in some embodiments, one or more data fields) can be skipped from the message parsing if the values in the mask sequences corresponding to the indexes of these data fields are not set to a specific value (for example, if the values are not set to "1"). According to another embodiment, the data field filter module 305 can be omitted because the operation of filtering out the data fields other than the specific data fields can be omitted, and in that case parse task logic 320 can simply parse the specific data field in accordance with the specific value.

According to one embodiment, the parse task logic 320 can be used for parsing the specific data fields if the indexes corresponding to these data fields in the masks are set to a specific value (for example, if the values are set to "1"), and only the parsed data fields will be maintained in the result as the structural data.

As shown in FIG. 3, the type of message structure 301 according to the disclosure can he, but is not limited to, JSON Schema, XML Schema, Protobuf (e.g., protocol buffers) IDL, Avro Schema, binary messages, and the like. Such message structures 301 can be stored in any number of memories, such as a nonvolatile memory of the computer system/server 12 according the embodiment of the present disclosure, or may be stored in other computing devices of a distributed stream processing system. The message structure 301 can he obtained by the analysis task logic 310 of the computer system/server 12 according to the embodiment of the present disclosure (herein only illustrating analysis task logic A and analysis task logic B) by accessing those nonvolatile memories or the other computing devices.

A message can include one or more data fields. In some embodiments, each value (or, in some embodiments, one or more values) of the one or more data fields, such as a value node in JSON or XML document or an integer value in a binary message, can be indexed by a unique integer or an integer sequence. The data fields in the message can be arranged in a manner such as a sequential structure, a non-sequential structure, or a nested structure. A unique integer index can be created for the data fields arranged in a sequential structure or a non-sequential structure. As used herein, the term "non-nested structure" can be interchangeable with "non-sequential structure." An integer sequence index can be created for the data fields arranged in a nested structure in some embodiments. The manners of creating an index for the data fields arranged in various structures will be illustrated with examples as follows.

EXAMPLE 1

Sequential Structure

In the message wherein the data fields are arranged in a sequential structure, the arrangement of the data fields can be sequential, such as arrays, records, and so on, and their index values can be determined in occurring order of the data fields. For example, the following can be an example, non-limiting message representing an order:

```
"message Order
{
    required uint64 uid;
    ... ...
    required float cost;
    ... ...
    optional string tag;
}"
```

In this embodiment, the data field "required uint64 uid" can represent a commodity identifier (ID), which can be a 64-bit unsigned integer, and the sequence appearing in the message can be "1." The data field "required float cost" can represent cost, which can be a float number, and the sequence appearing in the message can be "3." The data field "optional string tag" can represent a label of the commodity, which can be a character string, and the sequence appearing in the message can be "5."

Thus, according to embodiments of the present disclosure, integer 1 can be allocated as index of the data field "required uint64 uid", integer "3" can be allocated as index of data field "required float cost", and integer "5" can be allocated as index of the data field "optional string tag." Accordingly, the order message can be expressed as:

```
"message Order
{
    required uint64 uid=1;
    ... ...
    required float cost=3;
    ... ...
    optional string tag=5;
}"
```

EXAMPLE 2

Non-Sequential Structure

In a message wherein the data fields are arranged in a non-sequential structure, the arrangement of the data fields can be non-sequential, such as a data field of "keyword-value" type, a data field of mapping type, etc. Here, the non-sequential structure refers to the fact that the occurrence of each data field in the non-sequential structure is not sequential, and the occurrence of each data field can occur in various arrangements. The index values of the data fields in the non-sequential structure can be determined by an integer sequence after the data fields are re-sorted. For example, below is an example, non-limiting section of message with non-sequential structure:

```
"{
  "type": "record",
  "name": "LongList",
  "aliases": ["LinkedLongs"]
}"
```

In this embodiment, in the data field "type": "record", "type" can be a keyword, while "record" can be the corresponding value thereof (e.g., of the keyword) in the data field "name"; "LongList", "name" can be a keyword, while "LongList" can be the corresponding value thereof (e.g., of the keyword); in the data field "aliases": ["LinkedLongs"], "aliases" can be a keyword", while "LinkedLongs" can be the corresponding value thereof (e.g., of the keyword).

According to the embodiments of the present disclosure, each of data fields (or, in some embodiments, one or more data fields) can be sorted in accordance with the sequence of the first letter of the keyword from "a" to "z," thus the sorted message can be as follows:

```
"{
  "aliases": ["LinkedLongs"],
  "name": "LongList",
  "type": "record"
}"
```

Thus, according to the embodiment of the present disclosure, an integer "1" can be used as an index for the data field "aliases": ["LinkedLongs"], an integer "2" can be used as index of the data field "name": "LongList", and an integer "3" can be used as index of the data field "type": "record".

Under the circumstance where the first letter of multiple keywords is the same, the data fields can be sorted in a sequence of a second letter of the keyword from "a" to "z". Of course, the data fields can also he sorted in a sequence with the letter of the keywords from "z" to "a."

The scope of the above-described method of sorting the data fields of a message in non-sequential structure does not constitute a limitation to the present disclosure. For example, when the keyword is a number, the data fields therein can be sorted in a sequence in which the numbers are ordered from small to big or from big to small.

EXAMPLE 3

Nested Structure

The nested structure can be a data type of hierarchy structure such as, but not limited to, the JSON/XML/binary message, and the index value can be an integer sequence from a root node to the data field layer.

Figure 4:
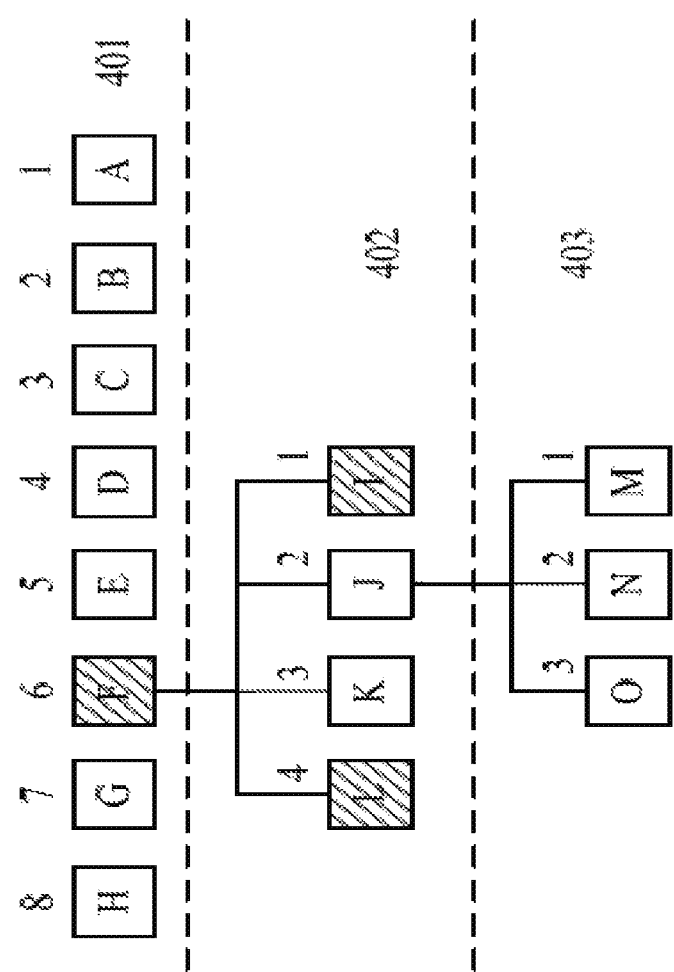
FIG. 4 is a diagram illustrating an example, non-limiting for creating index for the data field in a message with a nested structure according to the embodiment of the present disclosure.

FIG. 4 is a diagram illustrating an example, non-limiting for creating index for the data field in a message with a nested structure according to one or more embodiments of the present disclosure. As shown in FIG. 4, the message has data fields in the nested structure, wherein the first hierarchy 401 can include data fields A, B, C, D, E, F, G, H, as parent nodes, the second hierarchy 402 including data fields I, J, K, L, as subordinate nodes of the parent node F, and the third hierarchy 403 including data fields M, N, O, as subordinate nodes of the subordinate node J (grandchildren nodes of the parent node F).

In the above example, an integer sequence can be used to represent the index of the data field of each node (or, in some embodiments, one or more nodes). For example, for the subordinate node L of the parent node F, due to the parent node F being sorted as "6" in the first hierarchy (from right to left), and the subordinate node L being sorted as "4" in the second hierarchy (from right to left), the node L's index can be expressed as {6, 4}; while for the grandsubordinate node O, since it is sorted as "3" in the third hierarchy (from right to left), its index can be expressed as {6, 2, 3}. Above the sorting mode for indexing does not constitute a limitation to the scope of this disclosure, and according to other embodiments of the present disclosure, it may also index according to the sorting number from left to right, or in any other way of sorting.

Thus, according to the above description, the integer index or the integer sequence index can be created for the data fields in the sequential structure, the non-sequential structure (non-nested structure) or the nested structure and the like. The above operations of creating the indexes can be implemented by a data field index module 302 accessing the message structure stored in a computer system/server 12 according to one or more of the embodiments of the present disclosure.

The analysis task logic 310 according to one or more of the embodiments of the disclosure can determine which data field in the message structure is useful for the message parsing and which data field is useless (or is less useful or has less utility) by accessing the message structure stored in a computer system (e.g., computer system/server 12), and acquiring indexes of the data fields from the data field index module 302.

As an example of the order message with the sequential structure in the Example 1, the analysis task logic 310 can determine the data field "required float cost" and the data field "optional string tag" are useful in subsequent parsing task via accessing the message structure stored in computer system/server 12. Thus, the analysis task logic 310 can obtain the index "3" of the data field "required float cost" and the index "5" of the data field "optional string tag" from the data field index module 302.

As another example, with respect to the example of the nested structure in the Example 3, the analysis task logic 310 can determine the data fields D, F of the first hierarchy and the data fields I, L of the second hierarchy are useful data fields in subsequent parsing tasks via accessing the message structure stored in computer system/server 12. Thus, the analysis task logic 310 can obtain index "4" of the data field D, index "6" of the data field F, index {6, 1} of the data field I, and/or index {6, 4} of the data field L from the data field index module 302.

According to an embodiment of the present disclosure, the methods of the analysis task logic 310 identifying or determining the useful data fields in the message are various based on different parse task requirements. Examples in the real-time analysis are the methods of the SQL-syntax-based query, the programming model "MapReduce," the statistical function, etc. For example, in the "MapReduce" such as "a.map(x=> getDataField(x, 'tid') *2)," the "tid" can be identified (determined) as a useful data field in the message "x," because the parse task of the "MapReduce" of "a.map (x=> getDataField(x, 'tid') *2)" is to operate on some data fields. The specific method that the analysis task logic 310 identifies or determines the useful data fields n the message parsing procedure does not limit the scope of the present disclosure. In addition to the above examples of the method, the analysis task logic 310 can use any way that those skilled in the art know to identify or determine the useful data fields.

According to an embodiment of the present disclosure, the sequence of operations of creating index for the data fields in the message and identifying (e.g., determining) the specific data fields that are useful for parsing the message does not limit the scope of the present disclosure. Any one of the two operations can occur before the other one, or the two operations can occur simultaneously.

The data field index mask generation module 304 can receive the indexes from the analysis task logic 310, convert the indexes to mask sequences, and/or transmit the converted mask sequences to the parse task logic 320. According to one embodiment of the present disclosure, the mask sequence can be a binary mask sequence, and the binary mask sequence can be taken as an example in the following description. The binary mask sequence is a mapping from a set of positive integers to the values in binary set of {0, 1} for identifying which data field in a specific message structure is a useful data field. However, the binary mask sequence does not limit the scope of the present disclosure, any kind of mask sequences such as decimal, hexadecimal mask sequences can also be applied to the present disclosure.

For the example of the order message with the sequential structure in Example 1, the analysis task logic 310 can obtain index "3" of the data field "required float cost" and the index "5" of the data field "optional string tag" which are useful in the subsequent message parsing process from the data field index module 302. The data field index mask generation module 304 can convert the indexes into a binary mask sequence that can be expressed as [0,0,1,0,1,0,0], which can represent in the order message of the Example 1 that the data field "required float cost" sorted at No. 3 (from right to left) is a useful data field, and the data field "optional string tag" sorted at No. 5 (from right to left) is a useful data field. That is, the binary value (bit value) of the useful data field at the corresponding position in the binary mask sequence can be set to a specific value (for example, "1"), while the binary value (bit value) of the useless data field (or, the data field having less utility or meeting a certain condition regarding lack of utility) at the corresponding position in the binary mask sequence can be set to another specific value (for example, "0"). The binary value of the useful data field is not limited to the value of "1"; in various embodiments, the binary value of the useful data field can be set to any other specific value. For example, it can be set to "0" instead.

in accordance with an embodiment of the present disclosure, the binary mask sequence [0,0,1,0,1,0,0] can be sent to the parse task logic 320 such that the parse task logic 320 performs the parsing process to the message. Under the circumstance, the parse task logic 320 can identify the useful data fields in the messages to be processed based on the bit values set to "1" in the binary mask sequence [0,0,1,0,1,0,0], and can identify the useless data fields (or, the data fields having less utility or meeting a defined condition regarding lack of utility) in the messages to be processed based on the bit values set to "0" therein.

In accordance with another embodiment of the present disclosure, the data field index mask generation module 304 can calculate the decimal value (also referred to as a "decimal value sequence") corresponding to the binary mask sequence, and convert the binary mask sequence into the decimal value sequence. For example, the decimal value corresponding to the binary mask sequence [0,0,1,0,1,0,0] can be calculated as "20."

The calculated mask value "20" can be transmitted to the parse task logic 320 so that the parsing process can be performed to the message by the parse task logic 320. By restoring the decimal value "20" to the binary mask sequence [0,0,1,0,1,0,0], the parse task logic 320 can identify a useful data field in the messages to be processed based on the bit values set to "1" in the binary mask sequence, and identify useless data fields (or, the data fields having less utility or meeting a defined condition regarding lack of utility) in the messages to be processed based on the bit values set to "0" therein.

In some embodiments, whether a decimal value sequence or a binary mask sequence is sent to the parse task logic 320 can be based on the indication mode that requires small amount of data to be transferred, that is, a decimal value sequence or a binary mask sequence can be sent to the parse task logic 320 according to the criteria of small amount of data of the mask sequence to be transferred. For example, in instances in which the amount of the useful data fields is large (or, greater than a defined threshold), the binary mask sequence indicating the useful data fields may have a smaller amount of data to be transferred than the decimal value sequence, so the binary mask sequence can be sent to the parse task logic 320 instead of the decimal value sequence, and the reverse can also be true.

In the same manner, the mask sequence can be used for the message with the nested structure. For example, with respect to the example of the nested structure in Example 3, the analysis task logic 310 can determine the data fields D, F of the first hierarchy and the data fields I, L of the second hierarchy are the useful data fields in subsequent parsing tasks by accessing the message structure stored in computer systems, Thus, the analysis task logic 310 can obtain the index "4" of the data field D, the index "6" of the data field F, the index {6,1} of the data field I, and the index {6,4} of the data field L, from the data field index module 302.

The data field index mask generation module 304 can convert each index (or, in some embodiments, one or more indexes) into the binary mask sequences as [0,0,0,1,0,0,0], [0,1,0,0,0,0,0], {[0,1,0,0,0,0,01], [0,0,0,0,0,0,1]}, and {[0,1, 0,0,0,0,0], [0,0,0,1,0,0,0]}, which can represent in the message with the nested structure of Example 3 that the data fields D, F of the first hierarchy and the data fields I, L of the second hierarchy are the useful data fields. In a specific example, the binary values of the useful data fields at the corresponding positions in the binary mask sequence can be set to "1" while the binary values of the useless data fields (or, the data fields having less utility or meeting a defined condition regarding lack of utility) at the corresponding positions in the binary mask sequence can be set to "0".

In accordance with an embodiment of the present disclosure, the binary mask sequences [0,0,0,1,0,0,0], [0,1,0,0,0, 0,0], {[0,1,0,0,0,0,0], [0,0,0,0,0,0,1]}, and {[0,1,0,0,0,0,0], [0,0,0,1,0,0,0]} can be sent to the parse task logic 320 such that the parse task logic 320 performs the parsing process to the message. In such a case, the parse task logic 320 can identify the useful data fields in the messages to be processed by the bit values set to "1" in the binary mask sequences [0,0,0,1,0,0,0], [0,1,0,0,0,0,0], {[0,1,0,0,0,0,0], [0,0,0,0,0,0,1]}, and {[0,1,0,0,0,0,0], [0,0,0,1,0,0,0]}, and identify the useless data fields (or, the data fields having less utility or meeting a defined condition regarding lack of utility) in the messages to be processed by the bit values set to "0" therein.

In accordance with another embodiment of the present disclosure, the decimal values corresponding to the binary mask sequences can be calculated. For instance, the decimal values corresponding to the binary mask sequences [0,0,0, 1,0,0,0], [0,1,0,0,0,0,0], {[0,1,0,0,0,0,0], [0,0,0,0,0,0,1]}, and {[0,1,0,0,0,0,0], [0,0,0,1,0,0,0]} can be calculated as 8, 32, {32, 1}, {32, 8}, respectively.

The value sequence {8, 32, {32, 1}, {32, 8}} can be sent to the parse task logic 320 such that the parse task logic 320 performs the parsing process to the message. By re-sorting the decimal value sequence {8, 32, {32, 1}, {32, 8}} to correspond to the binary mask sequences [0,0,0,1,0,0,0], [0,1,0,0,0,0,0], {[0,1,0,0,0,0,0], [0,0,0,0,0,0,1]}, and {[0,1, 0,0,0,0,0], [0,0,0,1,0,0,0]} respectively, the parse task logic 320 can identify the useful data fields in the messages to be processed by the bit values set to "1" in the binary mask sequences, and identify the useless data fields (or, the data fields having less utility or meeting a defined condition regarding lack of utility) in the messages to be processed by the bit values set to "0" therein.

According to another embodiment of the present disclosure, the parse task logic 320 can be located in other computing devices in a distributed stream processing system (not shown) apart from the computer system/server 12 according to the present disclosure. Thus, in the present disclosure, the binary mask sequence can be transmitted to the other computing devices for performing the parsing tasks, and can be the other computing devices that perform the parsing operation to the message. The binary mask sequence can also be converted to a decimal value sequence, and the decimal value sequence can be sent to the other computing devices that perform the parsing tasks. The other computing devices that perform the parsing tasks can convert the decimal value sequence back to the binary mask sequence, and perform the parsing operation to the message.

The parse task logic 320 can receive mask sequences from the data field index mask generation module 304, and stores the mask sequences in the data field filter module 305. According to one embodiment of the present disclosure, the data fields useful for parsing the message among the at least one data field are parsed by the parse task logic 320 in accordance with the specific value (for example, "1") of the bit in the binary mask sequence.

According to another embodiment of the present disclosure, the data field filter module 305 can be called by the parse task logic 320 for filtering out the data fields unnecessary (or not used) in the message parsing process according to the stored mask sequences. For example, before or during the message parsing process, the parse task logic 320 can filter out the useless data fields by using the data field filter module 305. The specific rules can be: If the value corresponding to a data field in the binary mask sequence is not set to "1," skip from parsing the corresponding data field. Only the result of the parsed data fields is saved as structural data.

Particularly, for the data fields that are arranged in the sequential structure in Example 1, if the bit value of the current data field in the binary mask sequence is not set to "1," the rule can be to skip to the next sequential data field for the parsing operation. For the data fields that are arranged in the non-sequential structure in Example 2, the rule can be, if the bit value corresponding to a keyword in the binary mask sequence is not set to "1," skip from the parsing operation for the data field corresponding to the "keyword-value." For the data fields that are arranged in the nested structure in Example 3, the rule can be if the bit value of the data field corresponding to a parent node in the binary mask sequence is not set to "1," skip from the parsing operation for the parent node and all nodes under the parent node.

However, according to another embodiment of the present disclosure, the parse task logic 320 can parse the specific data fields according to the specific value in the mask sequences without the operation of filtering out the data fields other than the specific data fields.

One or more embodiments of the present disclosure may not only reduce the huge workload of the parse task logic 320, but also save large amount of memory space employed for storing the data fields before parsing and the parsed structural data, and/or reduce network bandwidth utilized for transmitting the parsed structural data.

According to another embodiment of the present disclosure, the data fields apart from the useful data fields can be filtered out after the message parsing operation.

For some special message parsers, such as the Protobuf, the parsing process can be difficult to control because the codes of the parser can be automatically generated. As such, it can be difficult to call the application programming interface (API) of the various modules and obtain the corresponding mask sequences before or during the parsing operation. But for the message parser of this type, the present disclosure can also filter out the useless data fields (or, the data fields having less utility or meeting a defined condition regarding lack of utility) from the structural data obtained after the parsing operation.

After the parsing operation of the parse task logic 320, the data field filter module can access the result data of the parsing operation, and remove the parsing result of the data fields corresponding to the bit value that is not set to "1" in the mask sequence without storing them as structural data.

Specifically, for the data fields with the sequential structure in Example 1, if the bit value corresponding to the current data field in the mask sequence is not set to "1," the parsing result of the current data field can be removed. For the data fields with the non-sequential structure in Example 2, if the hit value corresponding to a keyword in the mask sequence is not set to "1," the parsing result of the data field of the "keyword-value" can be removed. For the data field with the nested structure in the foregoing Example 3, if the hit value of the data field corresponding to a parent node in the mask sequence is not set to "1," the parsing result of the parent node and all nodes under the parent node can be removed.

In this case, even if the present disclosure cannot reduce the huge workload of the parse task logic 320, in one or more embodiments, it can be capable of saving a large amount of memory space typically employed for storing the parsed structural data, and saving network bandwidth typically employed for transmitting the parsed structural data after the parsing operation.

The data field index module 302, the analysis task logic 310, the data field index mask generation module 304, the data field filter module 305, and/or the parse task logic 320 according to the embodiment of the present disclosure can be computer program modules, which are stored in the memory 28, executed in the processing unit 16 of the computer system/server 12 shown in FIG. 1. They can also be implemented via one or more special purpose, dedicated hardware (or software) modules, and their implementation cannot be construed as limitation to the scope of the present disclosure.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

According to another embodiment of the present disclosure, the computer system/server 12 can be employed for parsing a message. The computer system/server 12 can be as shown in FIG. 1 and can comprise a memory 28, at least one processing unit 16, a display 24, and the like.

According to a further embodiment of the disclosure, a computer program product for parsing a message can be provided. The computer program product can include a computer readable storage medium, and on the computer readable storage medium computer program instructions are stored. The computer program instructions can be executed by at least one processor (e.g., processing unit 16), such that the at least one processor executes the method according to an embodiment of the present disclosure as above described.

A computer-implemented method, a computer system, and a computer program product for parsing a message are described as above in connection with specific embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
identifying, by a device operatively coupled to a processor, a specific data field of a message comprising at least one data field, wherein the specific data field is employed for parsing the message;
generating, by the device, a mask sequence corresponding to the message and in which a first bit corresponding to the specific data field is set to a specific value, wherein the mask sequence comprises a binary mask sequence;
determining, by the device, whether to transmit a decimal value sequence or the binary mask sequence for parsing the specific data field, wherein the decimal value sequence is a decimal representation of the binary mask sequence, and wherein the determining comprises:
determining a first amount of data to be transferred for the binary mask sequence for the specific data field and determining a second amount of data to be transferred for the decimal value sequence for the specific data field;
determining to transmit the binary mask sequence based on a determination that the first amount of data to be transferred for the specific data field is less than the second amount of data to be transferred for the specific data field; and
determining to transmit the decimal mask sequence based on a determination that the first amount of data to be transferred for the specific data field is greater than the second amount of data to be transferred for the specific data field: and parsing, by the device, the specific data field based on the specific value represented by the selected binary mask sequence or the selected decimal mask sequence, wherein the parsing results in decreasing a network bandwidth by allocating structural data in a distributed system associated with the message.

2. The computer-implemented method of claim 1, further comprising:
creating, by the device, an index for the at least one data field, wherein the generating the mask sequence comprises converting the created index to a binary mask sequence.

3. The computer-implemented method of claim 2, further comprising:
determining that the message contains the at least one data field in a non-nested structure
based on the determining that the message contains the at least one data field in the non-nested structure, creating an integer index for the at least one data field, wherein the message is sorted in alphabetical order of data fields of the at least one data field and the integer is comprised within a set of integers corresponding to the respective data fields and is in numerical order of the order of the sorted respective data fields.

4. The computer-implemented method of claim 2, wherein in response to determining that the message contains the at least one data field in a nested structure, the computer-implemented method further comprising creating an integer sequence index for the at least one data field.

5. The computer-implemented method of claim 1, wherein the parsing the specific data field further comprises filtering out a data field other than the specific data field in the at least one data field based on the specific value.

6. The computer-implemented method of claim 5, wherein the filtering out the data field other than the specific data field comprises:
based on a determination that the data field is in a non-nested structure, filtering out the data field corresponding to a keyword in response to a second bit corresponding to the keyword in the mask sequence being set to a value other than the specific value.

7. The computer-implemented method of claim 5, wherein the filtering out the data field other than the specific data field comprises:
based on a determination that the data field is in a nested structure, filtering out a parent node and all nodes under the parent node in response to a second bit corresponding to the parent node in the mask sequence being set to a value other than the specific value.

8. A computer system, comprising:
at least one processor;
a memory coupled to the at least one processor;
a set of computer program instructions stored in the memory, executed by the at least one processor to perform operations comprising:
identifying a specific data field in at least one data field, wherein he specific data field is useful for parsing a message;
generating a mask sequence corresponding to the message, wherein a first bit corresponding to the specific data field is set to a specific value, wherein the mask sequence comprises a binary mask sequence;
determining a first amount of data to be transferred for the binary mask sequence for the specific data field and determining a second amount of data to be transferred for the decimal value sequence for the specific data field, wherein the decimal value sequence is a decimal representation of the binary mask sequence;

determining to transmit the decimal mask sequence in lieu of the binary mask sequence based on a determination that the first amount of data to be transferred for the specific data field is greater than the second amount of data to be transferred for the specific data field; and parsing the specific data field based on the specific value, wherein the parsing results in decreasing a network bandwidth by allocating structural data in a distributed system associated with the message.

9. The computer system of claim 8, wherein the mask sequence comprises a binary mask sequence.

10. The computer system of claim 9, wherein the at least one processor also executes at least one of the set of computer program instructions to perform operations comprising:

creating an index for the at least one data field, wherein the generating the mask sequence comprises converting the created index to the binary mask sequence.

11. The computer system of claim 10 wherein the at least one processor also executes at least one of the set of computer program instructions to perform operations comprising:

in response to determining that the message comprises the at least one data field in a non-nested structure, creating an integer index for the at least one data field.

12. The computer system of claim 10, wherein the at least one processor also executes at least one of the set of computer program instructions to perform operations comprising:

in response to determining that the message comprises the at least one data field in a nested structure, creating an integer sequence index for the at least one data field.

13. The computer system of claim 10, wherein the at least one processor also executes at least one of the set of computer program instructions to perform operations comprising:

further converting the binary mask sequence to a decimal mask sequence for transmission.

14. The computer system of claim 8, wherein the at least one processor also executes at least one of the set of computer program instructions to perform operations comprising:

filtering out a data field other than the specific data field in the at least one data field based the specific value.

15. The computer system of claim 14, wherein the at least one processor executes at least one of the set of computer program instructions to perform operations comprising:

based on a determination that the data field is in a non-nested structure, filtering out the data field corresponding to a keyword in response to a second bit corresponding to the keyword in the mask sequence being set to a value other than the specific value.

16. The computer system of claim 14, wherein the at least one processor also executes at least one of the set of computer program instructions to perform the operations comprising:

based on a determination that the data field is in a nested structure, filtering out a parent node and all nodes under the parent node in response to a second bit corresponding to the parent node in the mask sequence being set to a value other than the specific value.

17. A computer program product for parsing a message containing at least one data field, the computer program product comprising a computer readable storage medium having program instructions embodied therewith, the program instructions executable by an electronic device to cause the electronic device to:

identify a specific data field in the at least one data field, wherein the specific data field is employed to parse the message;

generate a mask sequence corresponding to the message, wherein a bit corresponding to the specific data field is set to a specific value, wherein the mask sequence comprises a binary mask sequence;

determine a first amount of data to be transferred for the binary mask sequence for the specific data field and determining a second amount of data to be transferred for the decimal value sequence for the specific data field;

determine to transmit the binary mask sequence in lieu of the decimal mask sequence based on a determination that the first amount of data to be transferred for the specific data field is less than the second amount of data to be transferred for the specific data field; and parse the specific data field based on the specific value based on the specific value represented by the selected binary mask sequence or the decimal mask sequence, wherein the parsing results in decreasing a network bandwidth by allocating structural data in a distributed system associated with the message.

18. The computer program product of claim 17, wherein the mask sequence comprises a binary mask sequence.

* * * * *